United States Patent [19]

Yokokawa

[11] Patent Number: 4,904,853
[45] Date of Patent: Feb. 27, 1990

[54] DUAL-FUNCTION INFORMATION-CARRYING SHEET DEVICE

[75] Inventor: Jun Yokokawa, Tokyo, Japan

[73] Assignee: Kabushiki Kaisha Astex, Japan

[21] Appl. No.: 326,481

[22] Filed: Mar. 20, 1989

Related U.S. Application Data

[63] Continuation of Ser. No. 99,472, Sep. 22, 1987, abandoned.

[51] Int. Cl.⁴ ............................................. G06K 19/07
[52] U.S. Cl. .................................... 235/487; 235/467; 235/492; 235/494; 283/77
[58] Field of Search ............... 235/487, 492, 494, 467; 283/77

[56] References Cited

U.S. PATENT DOCUMENTS

| | | | |
|---|---|---|---|
| 4,031,640 | 6/1977 | Hanna | 283/77 |
| 4,171,864 | 10/1979 | Jung et al. | 235/467 |
| 4,175,775 | 11/1979 | Kruegle | 283/77 |
| 4,222,662 | 9/1980 | Kruegle | 283/77 |
| 4,252,427 | 2/1981 | Brecht | 283/77 |
| 4,443,027 | 4/1984 | McNeely | 283/77 |
| 4,590,366 | 5/1986 | Rothfell | 283/77 |
| 4,692,394 | 9/1987 | Drexler | 283/77 |

*Primary Examiner*—Harold I. Pitts
*Attorney, Agent, or Firm*—Ostrolenk, Faber, Gerb & Soffen

[57] ABSTRACT

A dual-function information carrying sheet device comprising a digital data storage medium for storing digital data, electrical contacts and an interface through which data is to be stored into or fetched from the digital data storage medium. A visual information record medium on which visual information is associated with the data stored or to be stored in the digital data storage medium is recorded.

5 Claims, 7 Drawing Sheets

DUAL-FUNCTION INFORMATION-CARRYING SHEET DEVICE

This is a continuation of application Ser. No. 07/099,472 filed on Sept. 22, 1987, now abandoned.

FIELD OF THE INVENTION

The present invention relates to an information carrying sheet device incorporating a digital data storage medium. Typical of a digital data storage medium for use in such an information carrying sheet device is a semiconductor integrated circuit chip (hereinafter referred to as IC chip) and, thus, the present invention specifically relates to an IC card using a single-chip or multi-chip semiconductor integrated circuit as the digital data storage medium.

More particularly, the present invention relates to a dual-function information carrying sheet device incorporating not only an IC chip as the digital data storage medium but also a visual information record medium on which visual information is printed, photographed, handwritten or otherwise recorded. An IC card having such a visual information record medium in addition to the digital data storage medium will be herein referred to as a dual-function IC card. Thus, the present invention also relates to an information read/write module to be used for the writing of descriptive and/or graphic information into an IC chip carried on a dual-function IC card or for the reading of information from the IC chip and reproduction of the visual information recorded on a visual information record medium removably or fixedly mounted on, forming an integral portion of, or otherwise carried on the dual-function IC card.

BACKGROUND OF THE INVENTION

Keeping pace with the progress in the semiconductor integrated circuit technology, IC cards incorporating semiconductor IC chips are gaining popularity for billing, accounting, booking and various other practical purposes. Information-carrying devices of this type are particularly for their far larger data storage capacities advantageous over magnetic-stripe cards and are expected to find application in widespread business and consumer trades. The data which are stored or can be stored on such a known IC card include only those which represent alphanumerical or otherwise descriptive and/or graphic information.

The present invention contemplates provision of a dual-function information carrying sheet device incorporating, in addition to an IC chip as the digital data storage medium, a visual information record medium on which visual information such as a picture or a graphic or alphanumerical pattern is printed, photographed, handwritten or otherwise recorded.

SUMMARY OF THE INVENTION

In accordance with one outstanding aspect of the present invention, there is provided a dual-function information carrying sheet device comprising (a) a digital data storage medium for storing digital data, (b) means through which data is to be stored into or fetched from the digital data storage medium, and (c) a visual information record medium on which visual information associated with the data stored or to be stored in the digital data storage medium is recorded.

In accordance with another outstanding aspect of the present invention, there is provided an information read/write apparatus for use with a dual-function information carrying sheet device including a digital data storage medium for storing digital data, electric coupling means through which data is to be stored into or fetched from the digital data storage medium, and a visual information record medium on which visual information associated with the data stored or to be stored in the digital data storage medium is recorded, the information read/write apparatus comprising (a) means for retaining the information carrying sheet device in correct position, (b) control means to be electrically connected to the digital data storage medium of the information carrying sheet device through the electric coupling means when the information carrying sheet device is in the correct position with respect to the control means, and (c) image reproduction means operative to optically reproduce the visual information on the visual information record medium of the information carrying sheet device when the information carrying sheet device is in the correct position with respect to the control means.

BRIEF DESCRIPTION OF THE DRAWINGS

The features and advantages of a dual-function information carrying sheet device according to the present invention will be more clearly appreciated from the following description taken in conjunction with the accompanying drawings in which like reference numerals designate similar or corresponding units, members and elements and in which.

DESCRIPTION OF THE PREFERRED EMBODIMENTS

Figure 1:
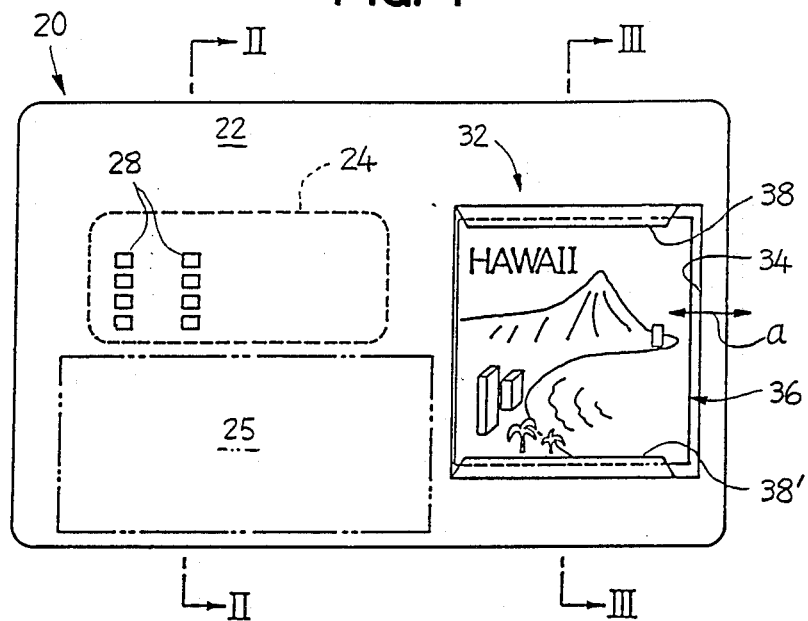
FIG. 1 is a plan view showing the general front configuration of a dual-function IC card implementing a first preferred embodiment of an information carrying sheet device according to the present invention.

A first preferred embodiment of a dual-function information carrying sheet device according to the present invention will now be described with reference to FIGS. 1 to 5. Referring first particularly to FIG. 1, the dual-function information carrying sheet device is provided in the form of an IC card 20 comprising a thin plastic plate 22 which typically measures approximately 85.7 mm in width, 54.0 mm in height and 0.76 mm in thickness. As is customary in the art, the plastic plate 22 has a digital data storage area 24 which is shown defined by broken lines and a general indication area 25 which is shown defined by dots-and-dash lines. In the general indication area 25 may be indicated, typically in embossed pattern, the nature of the card, the card owner's name and identification or registration number, and the term of validity of the card, though not shown in the drawings.

Figure 2:
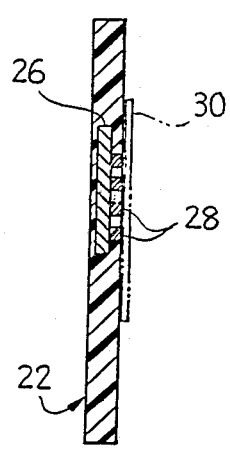
FIG. 2 is a sectional view taken along the line II—II shown in FIG. 1.

In the digital data storage area 24 is incorporated a digital data storage medium which is typically implemented by a semiconductor IC chip 26 as shown in FIG. 2. As will be described in mode detail, the IC chip 26 has stored therein digital data including control data to be predominant over the operation of the digital data storage medium implemented by the IC chip 26 and information data representative of the descriptive and/or graphic information to be visually and/or audibly reproduced. The IC chip 26 has a plurality of terminals or pins 28 for electrical connection to leads and contacts of an external read/write module as will be described. These terminals 28 are also located within the digital data storage area 24 and are exposed to the outside of the plastic plate 22 so as to be ready for such connection. Typically, such terminals 28 include a positive source voltage supply or Vcc terminal, a ground voltage supply or GND terminal, a programming voltage supply or Vpp terminal, a clock input or CLK terminal, a data input/output or I/O terminal, and a reset signal input or RST terminal. The terminal contacts 28 of the IC chip 26 may further include an RFU terminal or terminals reserved for future use. If desired, the terminals 28 of the chip 26 may be covered with a protective film 30 which is attached to the plastic plate 22 as indicated by phantom lines in FIG. 2. The protective film 30 is affixed along one of its vertical side edge on the front face of the plastic plate 22 in a manner to be capable of uncovering the terminals 28 when the IC card 20 is inserted into or otherwise installed on a read/write module.

In accordance with one important aspect of the present invention, the IC card 20 having descriptive and/or graphic information stored within the area 24 further has a piece or pieces of visual information carried on the plastic plate 22. For this purpose, the plastic plate 22 has in addition to the digital data storage area 24 a visual information carrying area 32 which is shown juxtaposed with the areas 24 and 25. Within the visual information carrying area 32 is formed a generally rectangular opening 34 and has movably and detachably accommodated therein a visual information record medium which is herein implemented by a printed, photographed or otherwise image-carrying slide 36 of a transparent plastic film. The image-carrying slide 36 is removable from the plastic plate 22 but is normally held in position within the opening 34 by suitable slide retaining means. In the embodiment herein shown, such slide retaining means comprises a pair of slightly spaced apart upper front and rear lap portions 38 defining at least a portion of the upper end of the opening 34 and a pair of slightly spaced apart lower front and rear lap portions 38' defining at least a portion of the lower end of the opening 34. These lap portions 38 and 38' form part of the plastic plate 22 and have an upper edge portion of the slide 36 slidably held between the lap portions 38 and a lower edge portion of the slide 36 slidably held between the lap portions 38' as will be better seen from FIG. 3. On the image-carrying slide 36 is recorded any visual information, such as a single frame of photographed or otherwise pictorial image relevant to or associated with the descriptive and/or graphic information stored in and reproducible from the digital data storage medium 26.

The slide 36 thus mounted on the plastic plate 22 with the aid of the lap portions 38 and 38' of the plate 22 is removable from the position in the opening 34 or replaceable back to the position as indicated by arrows "a" in FIG. 1. Such a removable slide 36 may be substituted by any printed, photographed or otherwise image-carrying film which is affixed to or integral with the plastic plate 22 or by an image pattern directly printed or deposited on the surface of the plate 22, though not shown in the drawings.

Figure 3:
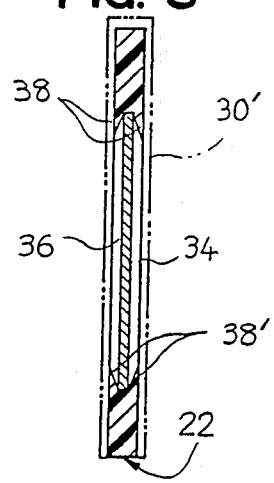
FIG. 3 is a sectional view taken along the line III—III shown in FIG. 1.

If desired, the visual information carrying area 32 of the dual-function IC card 20 may be in its entirety covered with a removable protective film 30' which wraps the plastic plate 22 throughout the width of the area 32 as indicated by phantom lines in FIG. 3. The protective film 30 may be removed from the plastic plate 22 to totally uncover the visual information carrying area 32 before the IC card 20 is to be inserted into or otherwise installed on a read/write module. As will be understood more clearly as the description proceeds, the information read/write module for use with the dual-function IC card 20 is used for the writing of descriptive and/or graphic information into the IC chip 26 or for the reading of information from the chip 26 and reproduction of the visual information recorded on the slide 36.

Figure 4:
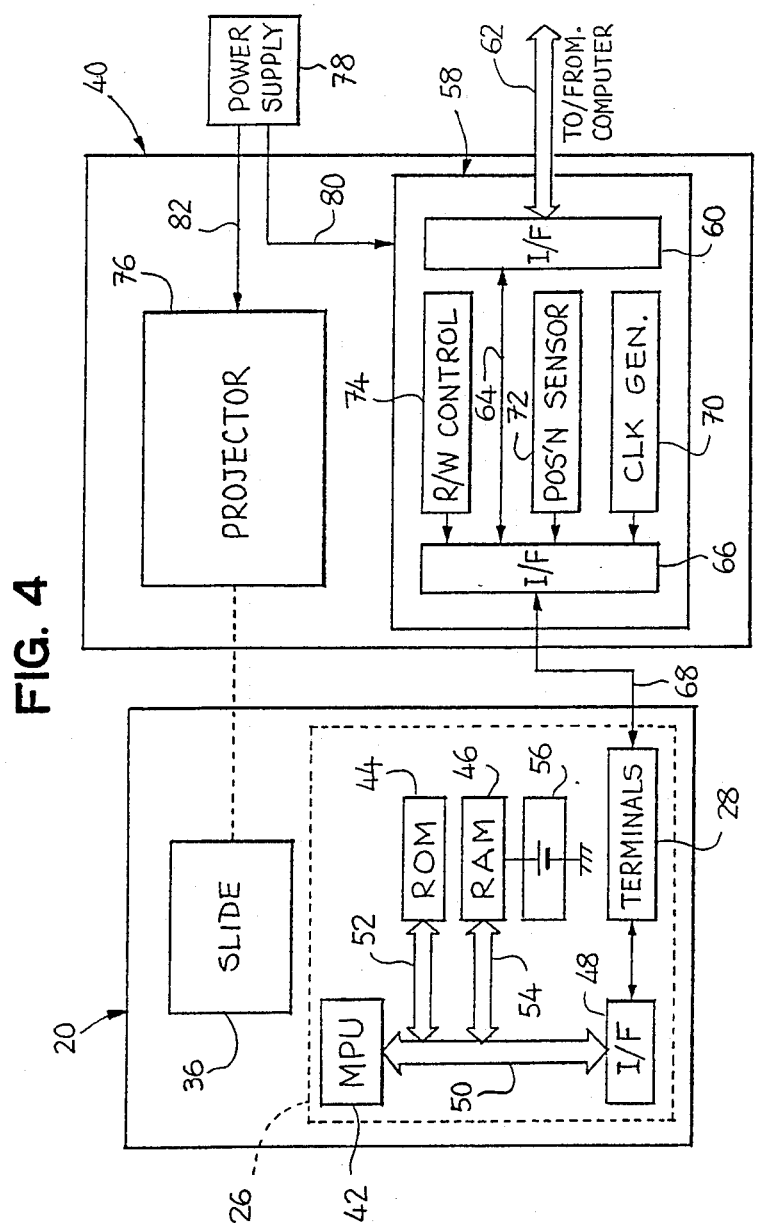
FIG. 4 is a schematic block diagram showing the circuit arrangements of the IC chip implementing the digital data storage medium of the dual-function information carrying sheet device shown in FIG. 1 and of an information read/write module which may be used with the IC chip.

FIG. 4 shows the general configurations of the IC chip 26 implementing the digital data storage medium and of such an information read/write module which is herein represented by reference numeral 40.

The IC chip 26 herein used may have a total memory capacity of 8 kilobytes by way of example and comprises a microprocessor 42 (MPU) which controls the input and output of information into and out of the IC chip 26. A read-only memory device 44 (hereinafter referred to as ROM device) has stored therein the control program and possibly further some fixed descriptive and/or graphic information data. A random-access memory device 46 (hereinafter referred to as RAM device) is provided for storing any desired descriptive and/or graphic information data written by the user. The IC chip 26 further comprises an interface network 48 through which the microprocessor 42 is to be coupled with the information read/write module 40. The microprocessor 42 and interface network 48 are coupled together by a bidirectional system bus 50. The microprocessor 42 fetches data from the ROM and RAM devices 44 and 46 through the system bus 50 and by way of bidirectional address/data buses 52 and 54, respectively. The data once loaded into the RAM device 46 may be stored and maintained therein with the device 46 periodically refreshed by means of a backup power supply battery 56. The interface network 48 may have incorporated therein a serial-parallel converter and is to be connected to the read/write module 40 through the terminals 28 of the IC chip 26. If desired, an electrically-erasable programmable ROM (EEPROM) may be used in lieu of, or in addition to, the ROM and RAM devices 44 and 46 for storing additional information rewritable by the user. Where the RAM device 46 is replaced with an EEPROM device and is thus dispensed with, the backup power supply battery 56 herein provided for the device 46 may also be omitted from the IC chip 26 to simplify the circuit configuration of the IC chip 26. As the ROM device 44 is preferably used a mask ROM device. Depending upon the intended application of the IC card 20, the total memory capacity of the IC chip 26 may be expanded to, for example, 16, 32, 64 kilobytes, or even more.

The information read/write module 40 for use with the dual-function IC card 20 having the IC chip 26 thus configured comprises a control circuit section 58 which is to intervene in effect between the dual-function IC card 20 and a suitable main control module (not shown) which may be implemented by a personal computer or a host computer system as will be described. Thus, the control circuit section 58 of the read/write module 40 comprises a first interface network 60 through which the control circuit section 58 is to be coupled with the main control module by way of a bidirectional bus 62. The first interface network 60 is connected through a bidirectional bus line 64 to a second interface network 66 through which the control circuit section 58 is to be coupled with the IC chip 26 of the card 20 by way of bidirectional bus lines 68. Each of the interface networks 60 and 66 may have incorporated therein a serial-parallel converter. Thus, the parallel binary signals transferred from the main control module to the first interface network 60 may be converted into serial binary signals for transmission to the IC chip 26 of the card 20 through the second interface network 66 of the read/write module 40. Conversely, the serial binary signals transferred from the IC chip 26 of the card 20 to the second interface network 66 of the read/write module 40 may be converted into parallel binary signals for transmission to the main control module through the first interface network 60 of the read/write module 40. The bidirectional bus lines 68 leading from the second interface network 66 are respectively connected to appropriate ones of the terminals 28 of the IC chip 26 of the card 20. Thus, the serial binary signals transferred from the interface network 66 of the read/write module 40 to the interface network 48 of the IC chip 26 may be converted into parallel binary signals for transmission to the microprocessor 42 of the IC chip 26. Conversely, the parallel binary signals transferred from the microprocessor 42 to the interface network 48 of the IC chip 26 may be converted into parallel binary signals for transmission to the interface network 66 of the read/write module 40.

The control circuit section 58 of the information read/write module 40 further comprises a clock generator 70, a card position sensor 72 and a read/write control network 74. The clock generator 70 is implemented by a crystal oscillator and produces a series of clock pulses to be used as time base signals in the IC chip 26 of the IC card 20. The card position sensor 72 is responsive to the position of the IC card 20 installed on the read/write module 40 and is operative to produce an output signal when the IC card 20 is correctly positioned in the read/write module 40. The read/write control network 74 is responsive to the signal thus produced by the card position sensor 72 and is in control of the operation to read data out of the ROM and RAM devices 44 and 46 or write data into the RAM device 46 of the IC chip 26 when the IC card 20 is properly positioned within the read/write module 40.

The information read/write module 40 further comprises image reproduction means implemented by a slide projector section 76 which is used for the optical reproduction of the visual information recorded on the image-carrying slide 36 on the dual-function IC card 20 properly installed on the read/write module 40. The control circuit and slide projector sections 58 and 76 of the read/write module 40 thus constructed and arranged are powered from a power supply unit 78 through d.c. and a.c. power supply lines 80 and 82, respectively, as shown.

Figure 5:
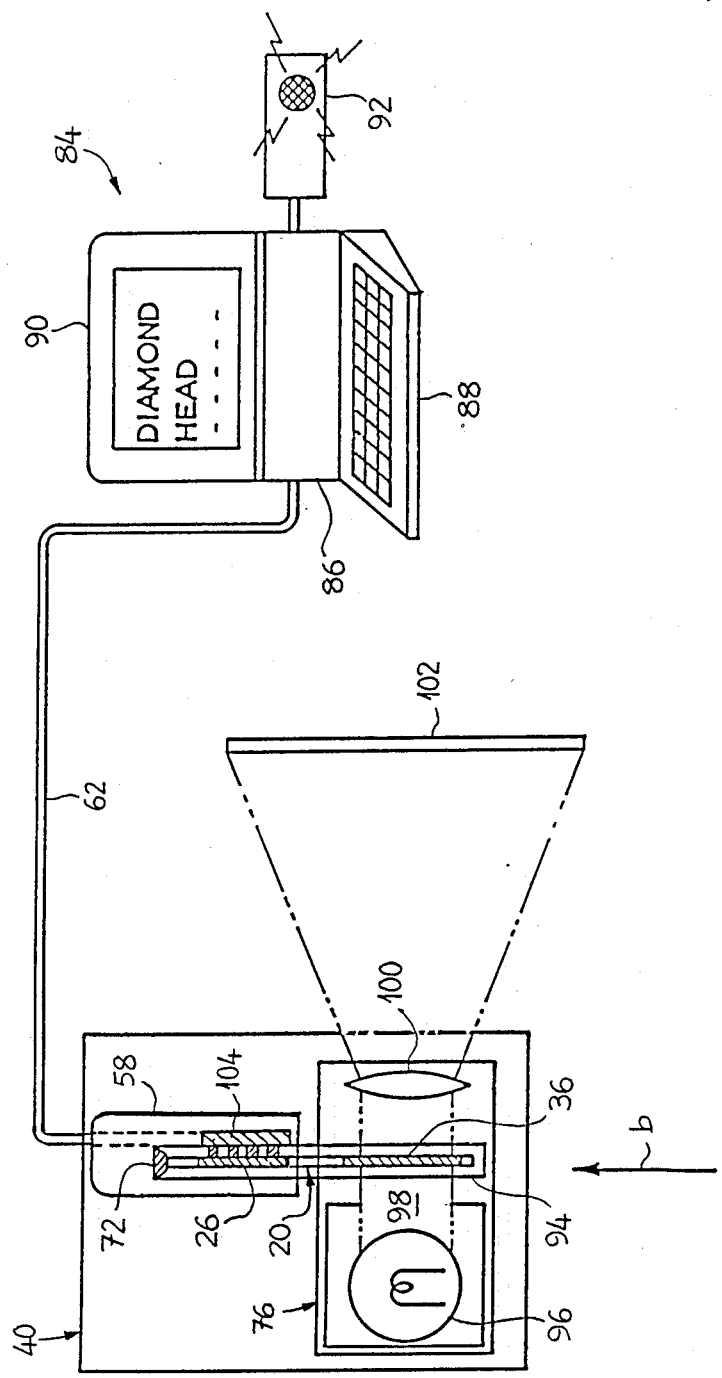
FIG. 5 is a view showing, partly in section and partly in perspective, the general mechanical construction of the slide projector section of such an information read/write module as arranged in combination with a main control module implemented by, for example, a personal computer or a host computer system.

The main control module operable with the read/write module 40 thus constructed and arranged may be implemented by a personal computer or a terminal of a host computer system as illustrated in FIG. 5. In FIG. 5, the main control module, now designated in its entirety by reference numeral 84, is shown comprising a computer including a control unit 86, a keyboard unit 88 which implements data and instruction input means, and a CRT (cathode-ray tube) display unit 90 which implements visual information output means. The main control module 84 may further comprise a speech synthesizer unit 92 operatively connected to the control unit 86 of the computer and implementing audio information output means. The control unit 86 of the main control module 84 controls each of the CRT display and speech synthesis units 90 and 92 to output visual and audible information from the descriptive and/or graphic information data read from the dual-function IC card 20. Though not shown, the main control module 84 may further comprise a printer to output printed information from the data read from the dual-function IC card 20. The control unit 86 of the main control module 84 thus constructed generally is coupled with the information read/write module 40 by means of a cable implementing the bidirectional bus 62 (FIG. 4) extending therebetween. In lieu of or in addition to the speech synthesizer unit 92 may be provided an ordinary loudspeaker (not shown) which operates on analog audio signals. For this purpose, the control circuit section 58 of the information read/write module 40 shown in FIG. 4 may further comprise a digital-to-analog converter to convert digital audio signals read from the IC chip 26 into analog versions for transmission to the loudspeaker.

In FIG. 5 is further illustrated the mechanical construction of the slide projector section 76 which forms part of the information read/write module 40. The slide projector section 76 of the read/write module 40 comprises a card retainer 94 for receiving therein the IC card 20 inserted into the read/write module 40. The card retainer 94 has an aperture portion with which is to be aligned the image-carrying slide 36 on the IC card 20 inserted into the read/write module 40 as in a direction indicated by arrow "b" and held in a correct position in the module 40. The IC card 20 set in the correct position within the read/write module 40 is detected by the card position sensor 72 (FIG. 4) which is shown located in association with the retainer 94. The slide projector section 76 further comprises a light source unit 94 positioned behind the aperture portion of the card retainer 92 and operative to emit light therefrom when electrically energized. The light source unit 96 is electrically connected to the power source 78 through the a.c. power supply line 82 shown in FIG. 4. Suitable aperture means 98 may be provided between the light source unit 96 and the aperture portion of the card retainer 94 to limit the divergence of the light directed from the source unit 96 toward the slide 36 on the IC card 20 in the correct position. In front of the aperture portion of the card retainer 94 is arranged a lens system 100 which is positioned in alignment with the aperture means 98 across the aperture portion of the card retainer 94. The lens system 100 is herein represented simply by a single convex lens but, in reality, includes a set of condensing lenses and a projection lens as is customary in the art, though not shown. The image-carrying slide 36 on the IC card 20 positioned correctly in front of the light source unit 96 across the aperture means 98 is illuminated by the light from the source unit 96 and the resultant optical image is magnified and thrown through the lens system 100 onto a projection screen 102 positioned at a given distance from the projector section 76.

The control circuit section 26 of the information read/write module 40 shown in FIG. 5 is arranged in association with the card retainer 94 of the projector section 76 thus constructed and arranged generally. The control circuit section 26 has a set of electrical contacts and leads 104 arranged to be contacted respectively by appropriate ones of the terminals 28 forming part of the circuit section 26 when the IC card 20 is correctly positioned within the read/write unit 40. The contacts and leads 104 of the control circuit section 26 are connected to the control unit 86 of the main control module or computer 84 through the cable 62. These contacts and leads 104 in combination with the interface networks 60 and 66 of the module 40 shown in FIG. 4 implement interconnect means for providing operative coupling between the main control module 84 and the dual-function IC card 20 as the digital data storage medium.

In using the dual-function IC card 20 for data writing purposes, the IC card 20 is inserted into the card retainer 94 of the read/write module 40 (FIG. 5) so that the card 20 is correctly positioned within the read/write module 40. The IC card 20 set in the correct position within the read/write module 40 is detected by the card position sensor 72 (FIGS. 4 and 5) to enable the read/write module 40 to relay the signals from the control module 84 down to the IC chip 26 of the IC card 20 through the control circuit section 58 of the read/write module 40. Any desired descriptive and/or graphic information may thus be loaded and stored into the RAM device 46 (FIG. 4) of the IC chip 26 through the keyboard unit 88 of the main control module 84 and the control circuit section 58 of the read/write module 40 (FIG. 5). As the visual information record medium of the card 20 is preliminarily prepared an image-carrying slide 36 bearing any desired image associated with the data thus stored into the IC chip 26 of the IC card 20. The IC card 20 carrying such a visual information in addition to the descriptive and/or graphic information written into the IC chip 26 is now ready to be used for data reading operation. During data reading operation, the microprocessor 42 of the IC chip 26 fetches instructions from the ROM device 44 under the control of the signals from the control circuit section 58, particularly, the read/write control network 74 of the read/write module 40 (FIG. 4). In accordance with the instructions thus fetched from the ROM device 44, descriptive and/or graphic information data are read selectively from the RAM device 46 and possibly also from the ROM device 44 and are transmitted through the interface network 48 of the IC chip 26 to the control circuit section 58 of the read/write module 40. The descriptive and/or graphic information data are passed through the interface networks 66 and 60 of the control circuit section 58 and are further transmitted through the cable 62 to the control unit 86 of the main control module 84 (FIG. 5). The descriptive and/or graphic information represented by the data thus loaded into the control unit 86 of the main control module 84 is output visually on the CRT display unit 90 and/or audibly from the speech synthesis unit 92 operatively connected to the control unit 84.

With the IC card 20 set in the correct position within the read/write module 40, the projector section 76 of the read/write module 40 is actuated under the control the signal from the card position sensor 72. The image-carrying slide 36 on the IC card 20 positioned in front of the light source unit 96 is thus illuminated by the light from the source unit 96 and the resultant optical image is magnified and thrown through the lens system 100 onto the projection screen 102 for viewing by an audience.

While it has been assumed that the ROM device 44 incorporated in the IC chip 26 of the IC card 20 has stored therein the control program and some fixed descriptive and/or graphic information data, the device 44 may used simply for the storage of fixed descriptive and/or graphic information data alone. A random-access memory device 46 (hereinafter referred to as the RAM device) is provided for storing any desired descriptive and/or graphic information data written by the user. Alternatively, the ROM device 44 and even the microprocessor 42 may be omitted from the IC chip 26 so that the IC chip 26 simply comprises the RAM device 46 in addition to the interface network 48 and the terminals 28. In this instance, the functions of the microprocessor 42 and RAM device 44 may be achieved from the control unit 86 of the main control module 84.

Furthermore, it has been assumed that the visual information record medium of the IC card 20 embodying the present invention consists of a single image-carrying slide but, if desired, such a medium may consist of two or more slides respectively bearing different images or different pieces of visual information. Such a plurality of slides may be provided in the form of a stack so that slides with different images can be selectively moved one after another into the position to be illuminated by the light from the source unit 96 (FIG. 5). Alternatively, a plurality of slides may be provided as the successive sections of a continuous tape arranged to be lengthwise movable through the position to be illuminated by the light from the source unit 96. Although, furthermore, the image-carrying slide 36 used as the visual information record medium in the embodiment described consists of a single frame of image, if desired, a slide having two or more sections may be used in substitution for such a single-frame slide. Where it is desired to use a plurality of slides in the form of a stack or a continuous tape, a plastic plate of a size larger than the standardized size may be used to form the IC card for mounting such slides. If it is preferred to avoid the use of such an enlarged IC card, microfilms may be used on an IC card of the standardized size. It may also be noted that, while the read/write module 40 is supported for its operation by the main control module 84, an information read/write module for use with a dual-function information carrying sheet device according to the present invention may have incorporated therein the capabilities of an ordinarily equipped computer in addition to the functions achievable by the control circuit section 58 of the read/write module 40 shown in FIG. 4.

Figure 6:
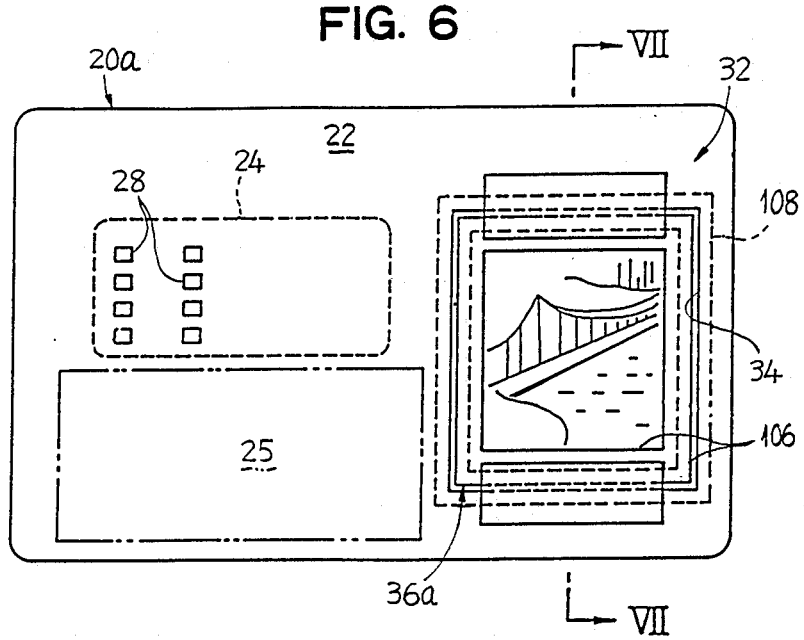
FIG. 6 is a view similar to FIG. 1 but shows the front configuration of a dual-function IC card implementing a second preferred embodiment of an information carrying sheet device according to the present invention.
Figure 7:
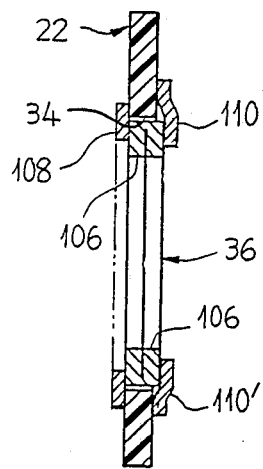
FIG. 7 is a sectional view taken along the line VII—VII shown in FIG. 6.

FIG. 6 shows the front configuration of a dual-function IC card implementing a second preferred embodiment of an information carrying sheet device according to the present invention. The dual-function IC card 20 herein shown, now denoted by 20a, is essentially similar to the embodiment shown in FIG. 1 except for the arrangement of the visual information record medium in the visual information carrying area 32 of the plastic plate 22. The visual information record medium of the IC card 20a comprises an image-carrying slide 36a having a hollow, rectangular frame member 106 attached to and reinforcing the slide along the upper and lower and vertical side edges of the slide 36a. The frame member 106 is sized so that the slide 36a as a whole can be loosely accommodated within the opening 34 in the visual information carrying area 32 of the plastic plate 22 as shown. On the plastic plate 22 of the IC card 20a having such a slide 36a is provided slide retaining means comprising a rectangular support member 108 securely attached to the rear face of the plate 22 and elongated upper and lower support members 110 and 110' securely attached to the front face of the plate 22, as will be better seen from FIG. 7. The rear support member 108 has portions respectively extending along the four edges defining the opening 34 in the plastic plate 22. The front upper support member 110 is elongated along the upper edge of the opening 34 and has an upper edge portion of the frame member 106 slidably interposed between the support member 110 and an upper portion of the rear support member 108. Likewise, the front lower support member 110' is elongated along the lower edge of the opening 34 and has a lower edge portion of the frame member 106 slidably interposed between the support member 110 and a lower portion of the rear support member 108. The slide 36a accommodated within the opening 34 is thus retained in place by means of the support members 108 and 110 along its upper end and by means of the support members 108 and 110' along its lower end. If desired, additional members similar to these support members may be provided at the corners of the opening 34 for holding the corner portions of the frame member 106 of the slide 36a. It will be apparent that the the rectangular support member 108 can also be attached to the front face of the plastic plate 22 with the elongated upper and lower support member 110 and 110' attached to the rear face of the plate 22.

Figure 8:
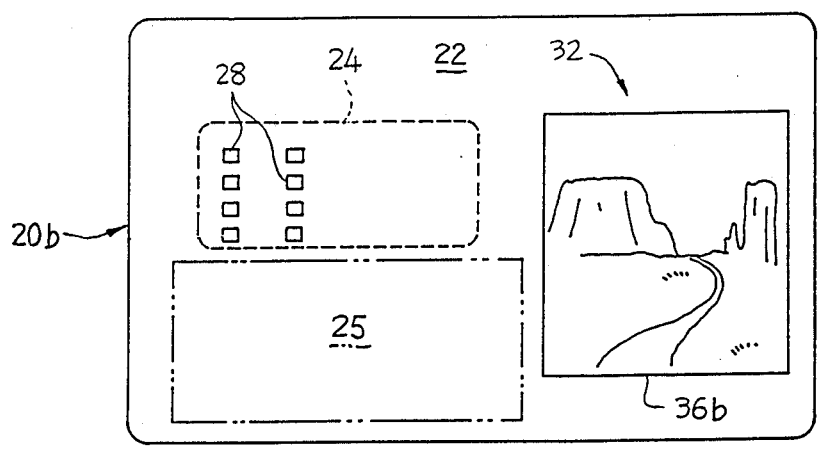
FIG. 8 is also similar to FIG. 1 but shows the front configuration of a dual-function IC card implementing a third preferred embodiment of an information carrying sheet device according to the present invention.

In FIG. 8 is shown the front configuration of a dual-function IC card 20b implementing a third preferred embodiment of an information carrying sheet device according to the present invention. In the dual-function IC card 20b herein shown, the visual information record medium is provided in the form of an opaque photographic print 36b glued or otherwise fixedly attached to the front face of the plastic plate 22 over the visual information carrying area 32 of the plate 22. The IC card 20b is in the other respects entirely similar to each of the IC cards described with reference to FIGS. 1 and 6.

Figure 9:
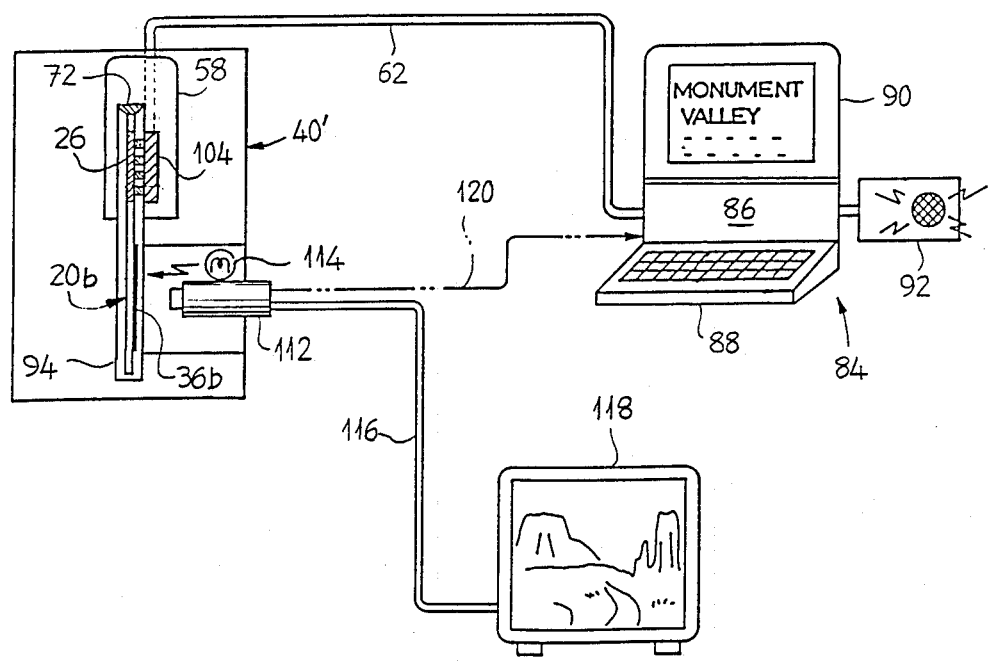
FIG. 9 is a view similar to FIG. 5 but shows the mechanical construction and arrangement of an information read/write module for use with the dual-function IC card shown in FIG. 8 as arranged in combination with a main control module also implemented by, for example, a personal computer or a host computer system.

FIG. 9 shows the mechanical construction and arrangement of the image reproduction means of an information read/write module for use with the dual-function IC card 20b thus having the photographic print 36b as the visual information record medium and arranged in combination with a main control module also implemented by a personal computer or a terminal of a host computer system. The image reproduction means of the information read/write module, now denoted by 40', comprises an image pickup device implemented by a television camera 112 and an illuminating device implemented by a light source unit 114. The television camera 112 is directed toward the photographic print 36b on the IC card 20b correctly positioned within the read/write module 40' by means of the card retainer 94 and is thus operative to optically pick up the image on the photographic print 36b which is illuminated by the light source unit 114. The optical image thus picked up by the television camera 112 is converted into electric video signals, which are transmitted through a cable 116 to a television receiver 118 for visual display on the screen thereof. The video signals produced by the television camera 112 may also be transmitted to the control unit 86 of the main control module 84 implemented by a computer through a line 120 indicated in phantom. In this instance, the video signals input to the control unit 86 of the main control module 84 may be superposed on, mixed with, or modified by the digital data signals supplied from the IC chip 26 of the IC card 20b. The television camera 112 used as part of the image reproduction means in the shown arrangement may consist of a solid-state camera using charge transfer devices (CTD) such as charge coupled devices (CCD) or bucket brigade devices (BBD). The image reproduction means thus consisting essentially of the television camera and receiver 112 and 118 may also be used in lieu of the slide projector section 76 of the read/write module 40 shown in FIG. 5. In this instance, the image-carrying slide 36 of the dual-function IC card 20 may consist of an opaque plastic film on which any visual information is printed or otherwise recorded. It may also be noted that the photographic print 36b used as the visual information record medium on the IC card 20b shown in FIG. 8 may be replaced with any other kinds of printed materials.

Figure 10:
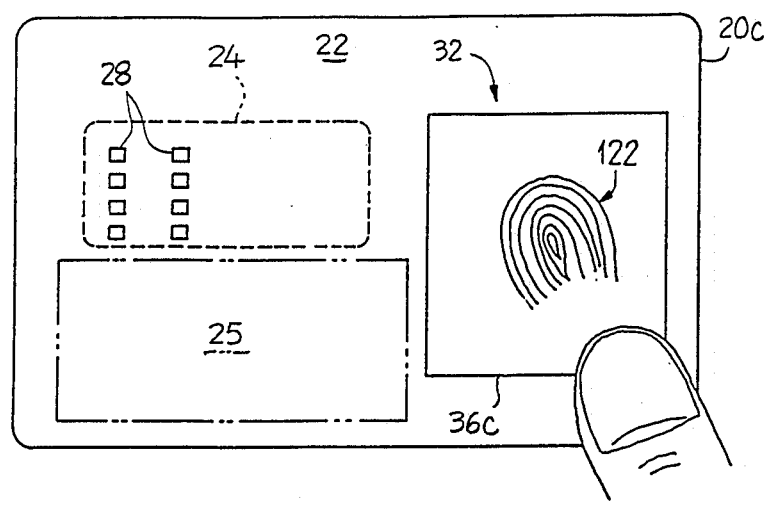
FIG. 10 is also similar to FIG. 1 but shows the front configuration of a dual-function IC card implementing a fourth preferred embodiment of an information carrying sheet device according to the present invention.

FIG. 10 shows a dual-function IC card forming a fourth preferred embodiment of an information carrying sheet device according to the present invention. In this dual-function IC card which is now denoted by 20c, a blank sheet material 36c of, for example, paper or plastic, is used as the visual information record medium and is glued or otherwise fixed on or detachably affixed to the front face of the plastic plate 22 over the visual information carrying area 32. The blank sheet material 36c may be coated with or formed by a coating of any material sensitive to heat, pressure, radiation or any other image-generative physical action or agency and may be imprinted with, for example, any private identification indicium such as the card owner's fingerprint as indicated at 122 or the card owner's signet, not shown. Alternatively, the blank sheet material 36c may be left plain so as to be filled in with any autographic information such as the card owner's signature, though not shown in the drawings. The image thus borne by the blank sheet material 36c may be reproduced by the use of the image reproduction means described with reference to FIG. 9, viz., with use of a television camera and a television receiver.

Figure 11:
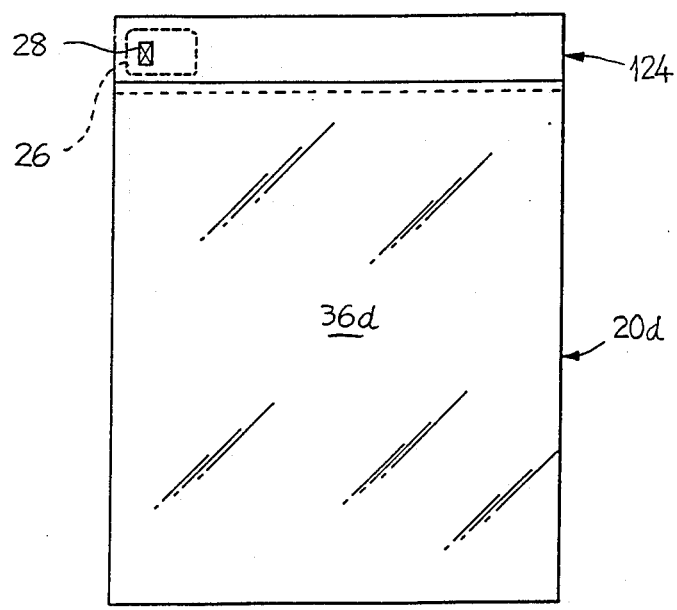
FIG. 11 is also similar to FIG. 1 but shows the front configuration of a dual-function IC card implementing a fifth preferred embodiment of an information carrying sheet device according to the present invention.

In FIG. 11 is shown a dual-function IC card providing a fifth preferred embodiment of an information carrying sheet device according to the present invention. The dual-function information carrying sheet device herein shown, now denoted by 20d, comprises an elongated support member 124 having retained therein an IC chip 26 which has the configuration described with reference to FIG. 1 and which thus includes the terminals 28 as shown. The information carrying sheet device 20d further comprises a transparent image-carrying sheet material 36d having a picture or a graphic pattern printed, photographed, handwritten or otherwise recorded thereon though not shown. The image-carrying sheet material 36d is detachably secured along one of its marginal portions to the support member 124 along a longitudinal edge of the support member 124 as indicated by a broken line. The image carried on the sheet material 36d thus attached to the support member 124 having the IC chip 26 thereon may be reproduced by means of an overhead projector (not shown).

Figure 12:
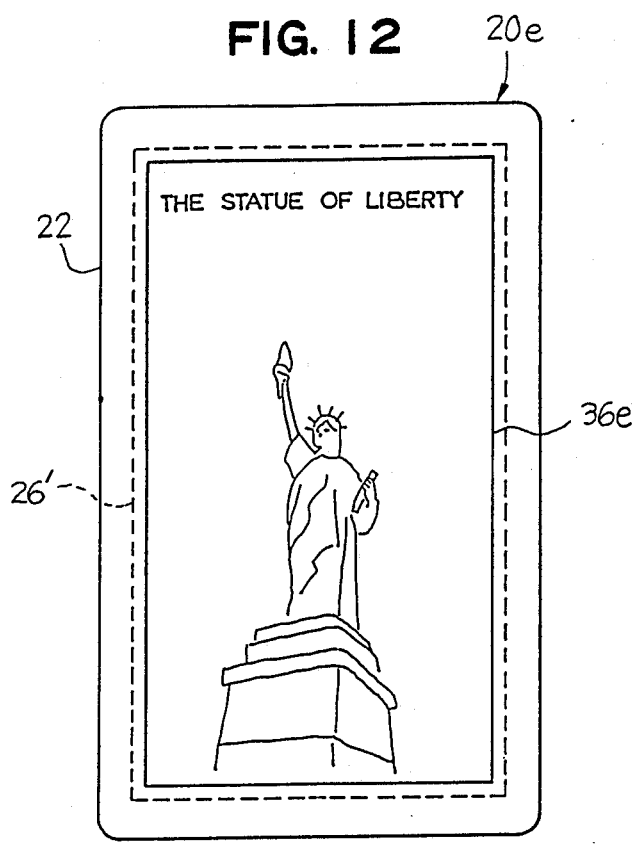
FIG. 12 is also similar to FIG. 1 but shows the front configuration of a dual-function IC card implementing a sixth preferred embodiment of an information carrying sheet device according to the present invention.

Turning to FIG. 12 a dual-function IC card 20e forming a sixth preferred embodiment of an information carrying sheet device according to the present invention comprises a plastic plate 22 having an image-carrying sheet material 36e mounted on one face of the plate 22 as a visual information record medium. The plastic plate 22 has further applied to the other face thereof a coating 26' of a material sensitive to an image-generative physical agency such as, for example, a magnetic recording material, an opto-magnetic recording material or a holographic light-sensitive material. The coating 26' of any of these materials is processed or to be processed to store digital data representative of any desired descriptive and/or graphic information to serve as a digital data storage medium. The digital data thus stored on the coating 26' can be reproduced by magnetically or holographically scanning and activating the magnetic or light-sensitive coating or scanning and activating the opto-magnetic coating with a laser beam, as the case may be.

What is claimed is:

1. A dual-function information carrying device, comprising:
   (a) an information carrying sheet and digital data storage means on the sheet for storing digital data;
   (b) means for writing data into or reading data from the digital data storage means; and
   (c) slide retaining means including inner edges defining in the sheet a substantially rectangular opening which penetrates through and is open on the opposite sides of the sheet such that said slide retaining means is effective for releasably retaining a projection display slide carrying a visible image and formed independently of said sheet in a manner wherein said slide is releasably retained in said opening by means of said inner edges and substantially the entire face area of the slide are exposed externally on both sides of the sheet through said opening.

2. A dual-function information carrying device as set forth in claim 1, in which said inner edges are spaced apart and extend substantially parallel to one another.

3. A dual-function information carrying device as set forth in claim 1, in which said slide retaining means further comprises a first support member attached to one surface of said sheet and having a portion elongated along at least a portion of one of said inner edges and a portion elongated along at least a portion of the other of said inner edges, and a pair of second support members attached to the other surface of said sheet, one of the second support members being elongated along at least a portion of one of said inner edges and the other of the second support members being elongated along at least a portion of the other of said inner edges, one of said portions of said first support member and one of the second support members having one edge portion of said projection display slide slidably and detachably held therebetween and the other of said portions of said first support member and the other of said second support members having another edge portion of said projection display slide slidably and detachably held therebetween.

4. A dual-function information carrying device as set forth in claim 2, in which said slide retaining means further comprises a first support member attached to one surface of said sheet device and having a portion elongated along at least a portion of one of said inner edges and a portion elongated along at least a portion of the other of said inner edges, and a pair of second support members attached to the other surface of said sheet, one of the second support members being elongated along at least a portion of one of said inner edges and the other of the second support members being elongated along at least a portion of the other of said inner edges, one of said portions of said first support member and one of the second support members having one edge portion of said projection display slide slidably and detachably held therebetween and the other of said portions of said first support member and the other of said second support members having another edge portion of said projection display slide slidably and detachably held therebetween.

5. An information read/write apparatus for use with a dual-function information carrying device of a type having a sheet body and a projection display slide carrying visible image and formed independently of the sheet body, the sheet body of the device carrying thereon digital data storage means for storing digital data, means for writing data into or reading data from the digital data storage means, and inner edges defining in the sheet body of the device a substantially rectangular opening which is open on the opposite sides of the sheet body, said slide being releasably retained in said opening by means of said inner edges and having its substantially entire area exposed externally on both sides of the sheet body through said opening, said information read/write apparatus comprising:
   (a) means for releasably retaining said information carrying device in a correct position;
   (b) control means for being electrically connected to said digital data storage means of said information carrying device through an electric coupling means when the information carrying sheet device is in said correct position with respect to said control means;
   (c) means for irradiating the slide located on the information carrying device in said correct position with a beam of light and producing an image-carrying beam which carries the image on said slide;
   (d) an image viewing screen positioned to receive the image-carrying beam of light from said slide; and
   (e) means for projecting the image-carrying beam of light onto said viewing screen.

* * * * *